(12) United States Patent
Himmelmann

(10) Patent No.: US 7,923,874 B2
(45) Date of Patent: Apr. 12, 2011

(54) NESTED TORSIONAL DAMPER FOR AN ELECTRIC MACHINE

(75) Inventor: Richard A. Himmelmann, Beloit, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 14 days.

(21) Appl. No.: 12/486,365

(22) Filed: Jun. 17, 2009

(65) Prior Publication Data

US 2010/0323804 A1 Dec. 23, 2010

(51) Int. Cl.
*H02K 15/02* (2006.01)

(52) U.S. Cl. .................... 310/75 D; 310/261.1

(58) Field of Classification Search .............. 310/51, 310/75 D, 90, 261.1
See application file for complete search history.

(56) References Cited

U.S. PATENT DOCUMENTS

| | | | | |
|---|---|---|---|---|
| 1,612,321 A | * | 12/1926 | Soderberg | 464/78 |
| 1,796,623 A | * | 3/1931 | Rodgers | 310/51 |
| 2,734,359 A | * | 2/1956 | Mulheim et al. | 464/97 |
| 3,560,774 A | * | 2/1971 | Reeves | 310/82 |
| 4,172,985 A | * | 10/1979 | Meier | 310/74 |
| 4,425,813 A | * | 1/1984 | Wadensten | 74/87 |
| 4,684,873 A | | 8/1987 | Glennon | |
| 5,704,111 A | * | 1/1998 | Johnson et al. | 29/598 |
| 6,064,121 A | | 5/2000 | Shervington et al. | |
| 6,105,743 A | | 8/2000 | Salecker et al. | |
| 6,174,254 B1 | | 1/2001 | Tsai | |
| 6,179,730 B1 | | 1/2001 | Keller et al. | |
| 6,218,757 B1 | * | 4/2001 | Ong et al. | 310/223 |
| 6,290,620 B1 | | 9/2001 | Tsai et al. | |
| 6,332,204 B1 | | 12/2001 | Russell | |
| 6,465,928 B1 | | 10/2002 | Shervington et al. | |
| 6,499,209 B1 | | 12/2002 | Landin et al. | |
| 6,727,609 B2 | | 4/2004 | Johnsen | |
| 7,013,859 B2 | | 3/2006 | Linnig | |
| 7,268,522 B1 | | 9/2007 | Baker | |
| 7,385,332 B2 | | 6/2008 | Himmelmann et al. | |
| 7,389,712 B2 | | 6/2008 | Himmelmann | |
| 7,500,416 B2 | | 3/2009 | Fenioux et al. | |
| 2003/0155202 A1 | | 8/2003 | Taniguchi | |
| 2004/0000820 A1 | | 1/2004 | Cromas et al. | |
| 2006/0041765 A1 | | 2/2006 | Taniguchi et al. | |
| 2006/0071575 A1 | | 4/2006 | Jansen et al. | |
| 2007/0151918 A1 | | 7/2007 | Fenioux et al. | |
| 2008/0116695 A1 | | 5/2008 | Peterson | |
| 2008/0197634 A1 | | 8/2008 | Himmelmann | |
| 2008/0197730 A1 | | 8/2008 | Himmelmann et al. | |

* cited by examiner

*Primary Examiner* — Dang D Le
(74) *Attorney, Agent, or Firm* — Cantor Colburn LLP

(57) ABSTRACT

A damper for an electric machine (10) includes a shaft (20) and at least one shaft segment (26) concentric about the shaft (20) and operably connected to the shaft (20). The at least one shaft segment (26) includes a plurality of shaft slots (38) extending through a wall (40) of the at least one shaft segment (26) to increase torsional compliance of the at least one shaft segment (26). A driveline mounted electric machine (10) includes at least one rotor (16) located at a central axis (18) of the electric machine (10) and a damper. The damper includes a shaft (20) in operable communication with the at least one rotor (16) and at least one shaft segment (26) concentric about the shaft (20) an operably connected thereto. The at least one shaft segment (26) includes a plurality of shaft slots (38) extending through a wall (40) of the at least one shaft segment (26) to increase torsional compliance of the at least one shaft segment (26).

19 Claims, 4 Drawing Sheets

NESTED TORSIONAL DAMPER FOR AN ELECTRIC MACHINE

CROSS-REFERENCE TO RELATED APPLICATIONS

This application contains subject matter related to the subject matter of the following co-pending applications, which are assigned to the same assignee as this application, Hamilton Sundstrand Corporation of Windsor Locks, Conn. The below listed applications are hereby incorporated by reference in their entirety:

U.S. patent application Ser. No. 12/499,292 filed Jul. 8, 2009, entitled NESTED EXCITER AND MAIN GENERATOR STAGES FOR A WOUND FIELD GENERATOR; U.S. patent application Ser. No. 12/502,492 filed Jul. 14, 2009, entitled HYBRID CASCADING LUBRICATION AND COOLING SYSTEM.

BACKGROUND OF THE INVENTION

The subject matter disclosed herein relates generally to electric machines. More specifically, the subject disclosure relates to torsional dampers for electric machines.

Historically, electrical power generation for ground vehicles has been accomplished via an alternator driven by a pulley connected to an engine crank shaft. As vehicle electric power demands increase, the ability of pulley-driven alternators to carry the mechanical loads from the crank shaft to the generator becomes limiting. As an alternative to a pulley-driven alternator, the electrical generator may be installed directly in the driveline of the engine. By installing the generator in the driveline, there are no pulley, gear, or chain systems needed to transfer load from the generator to the engine and/or power from the engine to the generator.

In a typical ground vehicle driveline, rapidly fluctuating torque output of the engine is smoothed through the use of a flywheel. The flywheel does not, however, entirely remove cyclic speed variations of the engine's output shaft. To further smooth the torque output of the engine, other means such as torsional dampers or fluid dynamic couplings are installed between the transmission and the engine. Installation of the generator in the driveline further compounded the issues because when coupled to the engine crank shaft, the generator's rotational inertia increased torsional stresses on the crank shaft leading to failure of the crank shaft. To alleviate this issue, a torsional damper, typically a long shaft, is installed between the generator and the engine flywheel. To decrease the overall length of the driveline generator installation, a more compact torsional damper is desired.

BRIEF DESCRIPTION OF THE INVENTION

According to one aspect of the invention, a damper for an electric machine includes a shaft and at least one shaft segment concentric about the shaft and operably connected to the shaft. The at least one shaft segment includes a plurality of shaft slots extending through a wall of the at least one shaft segment to increase torsional compliance of the at least one shaft segment.

According to another aspect of the invention, a driveline mounted electric machine includes at least one rotor located at a central axis of the electric machine and a damper. The damper includes a shaft in operable communication with the at least one rotor and at least one shaft segment concentric about the shaft and operably connected thereto. The at least one shaft segment includes a plurality of shaft slots extending through a wall of the at least one shaft segment to increase torsional compliance of the at least one shaft segment.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
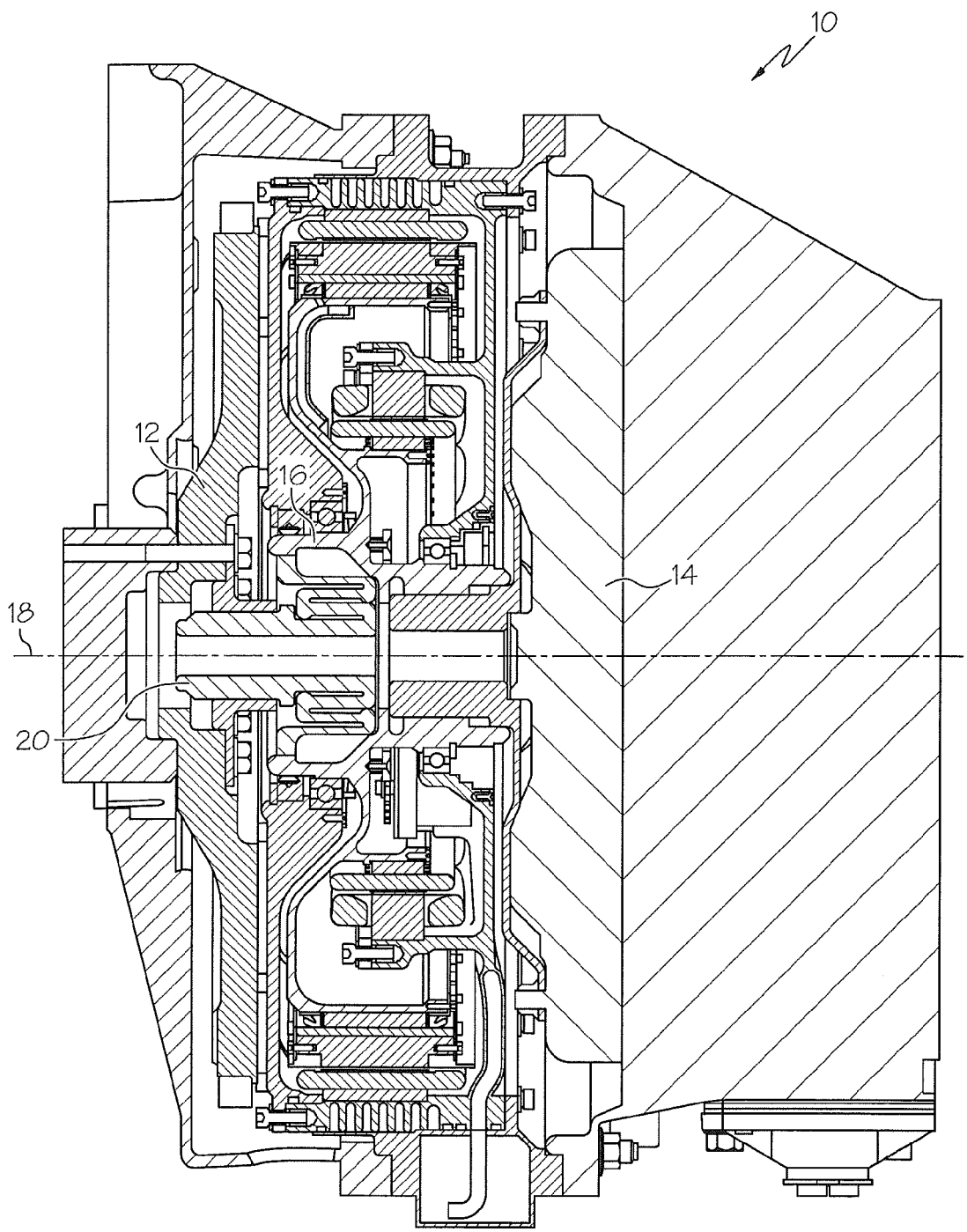
FIG. 1 is a cross-sectional view of an embodiment of a driveline mounted electric machine.

Shown in FIG. 1 is an embodiment of an electric machine 10. The electric machine 10, in this embodiment a generator, is disposed along a drive line between an engine flywheel 12 and a transmission 14. The electric machine 10 includes at least one rotor 16 rotatable about a central axis 18.

Figure 2:
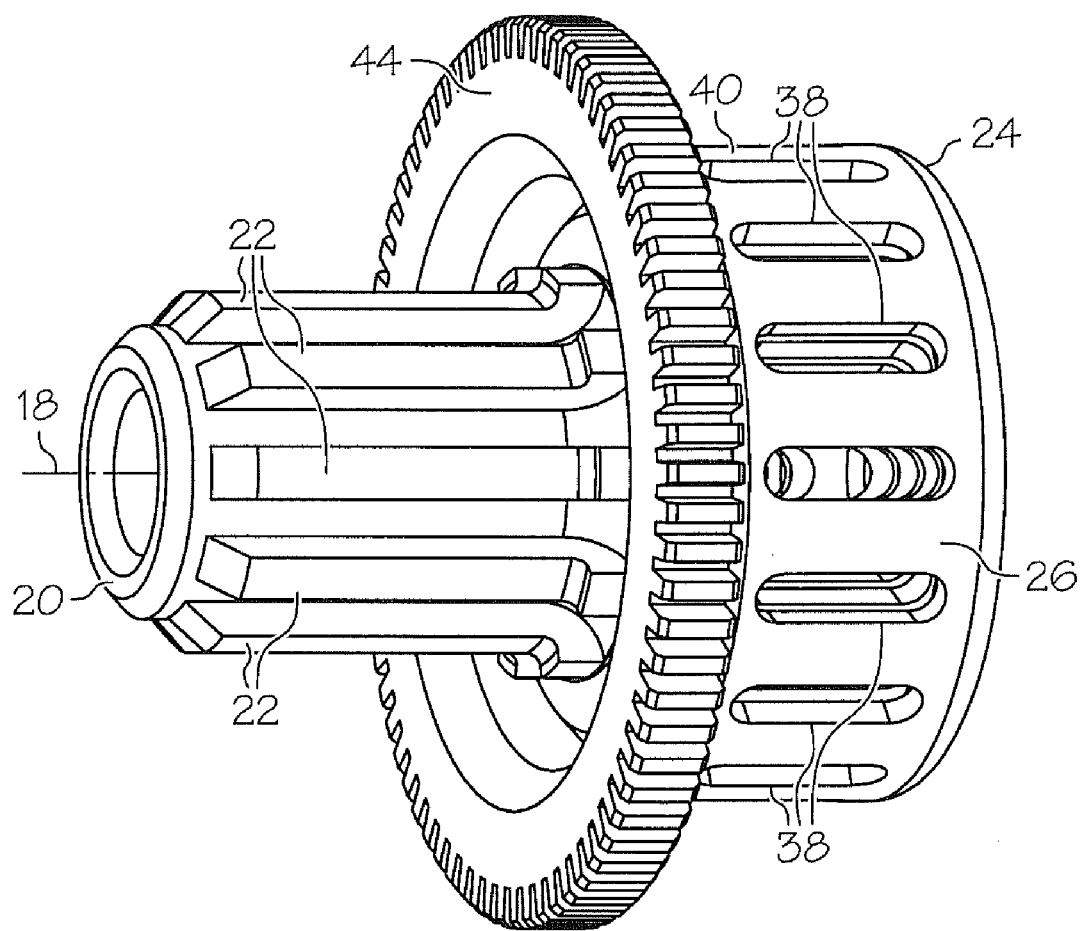
FIG. 2 is a perspective view of an embodiment of a torsional damper for an electric machine.

The electric machine 10 includes a generator shaft 20 connected to the flywheel 12 and disposed along the central axis 18. Referring now to FIG. 2, in some embodiments the generator shaft 20 is connected to the flywheel 12 via a spline connection. In the embodiment of FIG. 2, the generator shaft 20 includes a plurality of spline teeth 22 extending outwardly from the generator shaft 20, which are engageable with a plurality of flywheel spline teeth (not shown) which extend inwardly from the flywheel 12. It is to be appreciated that the configuration illustrated is merely exemplary and the connection between the generator shaft 20 and the flywheel may be accomplished in other ways. For example, the spline teeth 22 of the generator shaft may extend inwardly and engage with flywheel spline teeth extending outwardly from a portion of the flywheel 12. Further, the connection may be achieved via the utilization of threaded fasteners (such as nuts and bolts), a key or pin arrangement and/or a press fit between the components.

Figure 3:
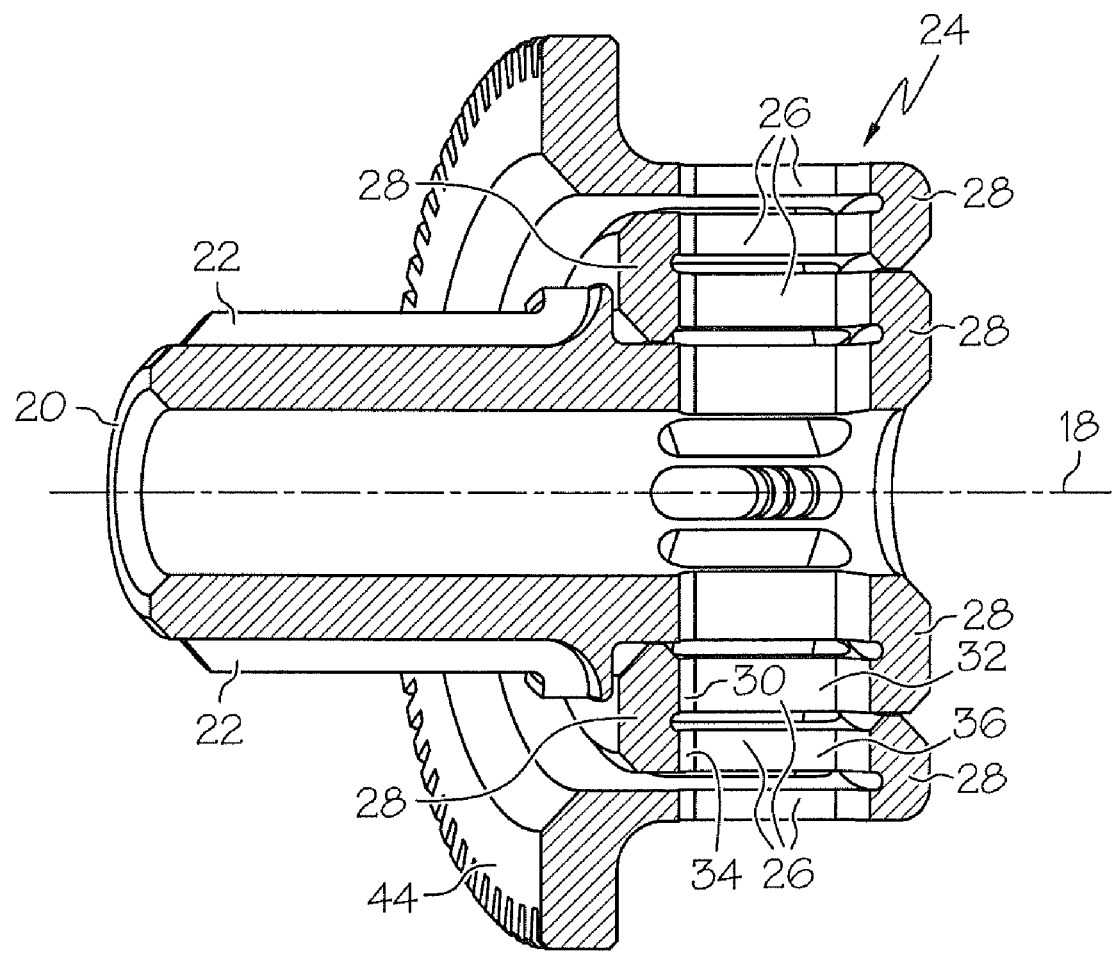
FIG. 3 is a cross-sectional view of an embodiment of a torsional damper for an electric machine.

The generator shaft 20 includes a nested torsional damper 24. As best shown in FIG. 3, the torsional damper 24 comprises at least one concentric shaft segment 26 arranged about the generator shaft 20. The embodiment of a torsional damper 24 illustrated in FIG. 3 includes three concentric shaft segments 26, but other quantities of shaft segments 26, for example, four or five shaft segments 26 are contemplated by the present disclosure. The at least one shaft segment 26 is connected to the generator shaft 20 and connected to adjacent shaft segments 26 via at least one segment end 28. As shown, for example, a segment end 28 connects a first end 30 of a first shaft segment 32 to a second end 34 of a second shaft segment 36, the second shaft segment 36 being disposed directly radially outboard of the first shaft segment 32.

Referring again to FIG. 2, to increase torsional compliance of the torsional damper 24, the at least one shaft segment 26 includes a plurality of slots 38. The plurality of slots 38 extend through a wall 40 of the at least one shaft segment and are configured to allow the wall 40 to deform in a tangential direction in response to torsional load thus increasing the torsional compliance capabilities of the torsional damper 24. In the embodiment shown, the plurality of slots 38 are arranged circumferentially around the at least one shaft segment 26 and extend longitudinally along the central axis 18. Other configurations of the plurality of slots 38, however, are contemplated to achieve desired dampening characteristics. For example, the slots may be smaller and more numerous, or larger and fewer in quantity, or the plurality of slots may extend at an angle skewed to the central axis 18 to bias dampening properties in a desired direction. Further, as shown in FIG. 4, one or more slots 38 of the plurality of slots 38 may be filled with a rubber damper 42, which may be vulcanized in place in the one or more slots 38 to further dampen the loads acting on the torsional damper 24 and the generator shaft 20.

Figure 4:
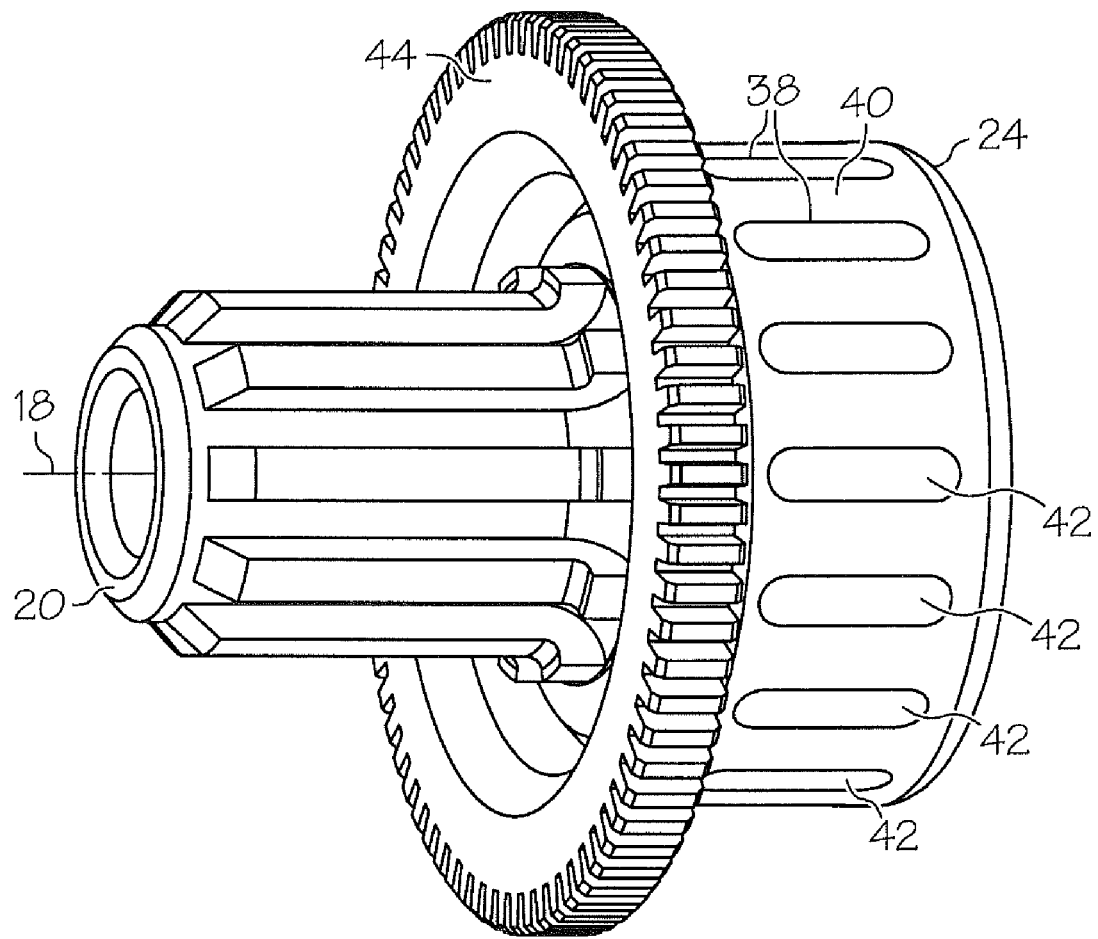
FIG. 4 is a perspective view of another embodiment of a torsional damper for an electric machine.

In some embodiments, as shown in FIG. 4, the torsional damper 24 includes a spline or gear interface 44 to the at least one rotor 16 of the electric machine 10. The gear interface 44 meshes with a complimentary feature (not shown) on the at least one rotor 16, thus driving rotation of the at least one rotor 16 via rotation of the generator shaft 20. It is to be appreciated that, that embodiments where the torsional damper 24 is integral to the generator shaft 20 are merely exemplary. Alternative embodiments where, for example, the torsional damper 24 is integral to the at least one rotor 16 or other rotating component, or where the torsional damper 16 secured to one of the at least one rotor 16 or the generator shaft 20 by some mechanical means are contemplated within the present scope.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A damper for an electric machine (10) comprising:
a shaft (20); and
two or more radially stacked shaft segments (26) concentric about the shaft (20) and operably connected thereto, the two or more stacked shaft segments connected to each other by a plurality of end segments, each shaft segment of the two or more shaft segments (26) including a plurality of shaft slots (38) extending through a wall (40) thereof to increase torsional compliance of the two or more shaft segments (26).

2. The damper of claim 1 wherein each shaft slot (38) of the plurality of shaft slots (38) extends in a substantially longitudinal direction along the two or more shaft segments (26).

3. The damper of claim 1 wherein at least one shaft segment (26) of the two or more shaft segments is connected to the shaft (20) via an end segment (28).

4. The damper of claim 1 wherein a first end (30) of a first shaft segment (32) is connected to a second end (34) of a second shaft segment (36) via an end segment (28).

5. The damper of claim 4 wherein the first shaft segment (32) is radially adjacent to the second shaft segment (36).

6. The damper of claim 1 wherein a filler (42) is disposed in at least one shaft slot (38) of the plurality of shaft slots (38).

7. The damper of claim 6 wherein the filler (42) comprises vulcanized rubber.

8. The damper of claim 1 wherein the shaft (20) includes a plurality of spline teeth (22).

9. A driveline mounted electric machine (10) comprising:
at least one rotor (16) disposed at a central axis (18) of the electric machine (10); and
a damper comprising:
a shaft (20) in operable communication with the at least one rotor (16); and
two or more radially stacked shaft segments (26) concentric about the shaft (20) and operably connected thereto, the two or more stacked shaft segments connected to each other by a plurality of end segments, each shaft segment of the two or more shaft segments (26) including a plurality of shaft slots (38) extending through a wall (40) thereof to increase torsional compliance of the two or more shaft segments (26).

10. The electric machine (10) of claim 9 wherein each shaft slot (38) of the plurality of shaft slots (38) extends in a substantially longitudinal direction along the two or more shaft segments (26).

11. The electric machine (10) of claim 9 wherein the two or more shaft segments (26) is connected to the shaft (20) via an end segment (28).

12. The electric machine (10) of claim 9 wherein a first end (30) of a first shaft segment (32) is connected to a second end (34) of a second shaft segment (36) via an end segment (28).

13. The electric machine (10) of claim 12 wherein the first shaft segment (32) is radially adjacent to the second shaft segment (36).

14. The electric machine (10) of claim 12 wherein a filler (42) is disposed in at least one shaft slot (38) of the plurality of shaft slots (38).

15. The electric machine (10) of claim 14 wherein the filler (42) comprises vulcanized rubber.

16. The electric machine (10) of claim 9 wherein the shaft (20) includes a plurality of spline teeth (22) to operably connect the shaft (20) to a flywheel (12).

17. The electric machine (10) of claim 9 comprising a plurality of gear teeth (44) disposed at the at least one shaft segment (26).

18. The electric machine (10) of claim 17 wherein the damper is operably connected to the at least one rotor (16) via the plurality of gear teeth (44).

19. The electric machine (10) of claim 9 wherein the damper is integrated directly into the at least one rotor (16).

\* \* \* \* \*